US009118168B2

(12) United States Patent
Lange et al.

(10) Patent No.: US 9,118,168 B2
(45) Date of Patent: Aug. 25, 2015

(54) SPARK GAP CONFIGURATION FOR PROVIDING OVERVOLTAGE PROTECTION

(75) Inventors: Dennie Lange, Erlangen (DE); Joerg Ochs, Igensdorf (DE); Michael Soeder, Heroldsbach (DE)

(73) Assignee: Siemens Aktiengesellschaft, Munich (DE)

( * ) Notice: Subject to any disclaimer, the term of this patent is extended or adjusted under 35 U.S.C. 154(b) by 275 days.

(21) Appl. No.: 13/643,882

(22) PCT Filed: Apr. 28, 2010

(86) PCT No.: PCT/EP2010/055724
§ 371 (c)(1), (2), (4) Date: Oct. 26, 2012

(87) PCT Pub. No.: WO2011/134508
PCT Pub. Date: Nov. 3, 2011

(65) Prior Publication Data

US 2013/0038977 A1 Feb. 14, 2013

(51) Int. Cl.
*H02H 7/20* (2006.01)
*H01T 4/14* (2006.01)
*H01T 4/10* (2006.01)

(52) U.S. Cl.
CPC ... *H01T 4/14* (2013.01); *H01T 4/10* (2013.01)

(58) Field of Classification Search
USPC .......... 361/112
See application file for complete search history.

(56) References Cited

U.S. PATENT DOCUMENTS

| | | | | |
|---|---|---|---|---|
| 4,493,004 | A | 1/1985 | Lange et al. | |
| 4,553,063 | A | 11/1985 | Geibig et al. | |
| 4,672,259 | A * | 6/1987 | Riggins et al. | 313/231.11 |
| 5,142,434 | A | 8/1992 | Boy et al. | |
| 6,529,361 | B1 | 3/2003 | Petschel et al. | |
| 2003/0214302 | A1 * | 11/2003 | Slamecka | 324/424 |
| 2013/0038977 | A1 | 2/2013 | Lange et al. | |

FOREIGN PATENT DOCUMENTS

| | | | |
|---|---|---|---|
| CN | 1273689 | A | 11/2000 |
| CN | 201887330 | U | 6/2011 |
| JP | 2008176950 | A | 7/2008 |

* cited by examiner

*Primary Examiner* — Dharti Patel
(74) *Attorney, Agent, or Firm* — Laurence A. Greenberg; Werner H. Stemer; Ralph E. Locher

(57) ABSTRACT

In order to provide a spark gap configuration for overvoltage protection, the spark gap configuration has electrodes that face each other and exhibit a short deionization time. The electrodes have, on at least a portion thereof, a current-path bounding device for forcing a desired current path in the electrodes themselves resulting in improved spark behavior.

13 Claims, 5 Drawing Sheets

SPARK GAP CONFIGURATION FOR PROVIDING OVERVOLTAGE PROTECTION

BACKGROUND OF THE INVENTION

Field of the Invention

The invention relates to a spark gap for providing overvoltage protection having an electrode arrangement which has electrodes that face one another.

Spark gaps are used in the field of electrical energy transmission and distribution, for example in series compensation systems. Such series compensation systems are normally used for reactive power compensation in alternating current networks and come under the heading of so-called Flexible AC Transmission Systems (FACTS). For series compensation, a capacitor bank is usually connected in series in an alternating current line, wherein protective surge diverter banks are arranged in parallel with the capacitor bank. The spark gap is used to protect both the capacitor and the surge diverter banks. It can be triggered very quickly compared with a mechanical circuit breaker, enabling overvoltages in the surge diverter and capacitor banks to be prevented.

Known spark gaps have at least one electrode arrangement composed of mutually opposing electrodes, the spacing or spacings between which is/are adjusted so that the spark gap does not break down of its own accord below a certain voltage, thus enabling the spark gap to be actively triggered. The triggering of the spark gap causes an arc to form between the electrodes. After the formation of the arc, a circuit breaker arranged in parallel with the spark gap is closed and the arc is therefore extinguished.

It is expedient that the spark gap has a short deionization time so that it quickly achieves its dielectric strength once more after the arc has been extinguished. When the said dielectric strength has become established, the parallel circuit breaker can be reopened. The spark gap is then ready for use once more.

The arc initially occurs at a point with the smallest electrode spacing. For a short deionization time, it is necessary that the arc leaves this point of smallest spacing as quickly as possible. It is also known that an arc can be driven by forces of magnetic fields which are caused by the current which flows through the electrode arrangement and the arc. It is likewise known that a moving conductor loop through which a current flows tries to increase in size, as the magnetic field produced by the current inside the loop is denser than outside. The current strength determines the strength of the magnetic field and therefore the magnitude of the magnetic force which drives the arc. The direction of the said magnetic force is determined by the current path.

In practice, electrode arrangements of this kind are accommodated in at least one spark gap housing in order to protect the electrodes against damaging environmental influences.

BRIEF SUMMARY OF THE INVENTION

The object of the invention is to provide a spark gap of the kind mentioned in the introduction, with which an arc which has been formed leaves the point of lowest electrode spacing as quickly as possible and in doing so increases in size.

The invention achieves this object in that at least some of the electrodes have current-path bounding means for forcing a desired current path in the electrodes.

According to the invention, at least some of the electrodes of the spark gap have current-path bounding means for bounding or defining a desired current path in the electrodes themselves. The invention is based on the idea that a current path which expediently runs very close to the arc causes a force to act on the arc which is many times greater than more remote current paths which, for example, are provided by the form of the feed conductors and cannot be arranged arbitrarily close to the point of origin of the arc for reasons of the dielectric strength to be maintained. The greater the spacing chosen for the electrodes, the smaller the effect of the current in the electrical feed conductors, so that, in particular from a certain electrode spacing and with increasing electrode spacing, the current-path bounding means are all the more conducive to driving the arc in the required direction and in doing so to increasing it in size. The embodiment of the spark gap according to the invention is therefore particularly suitable for high voltages. At the same time, it is also possible for the spark gap to have a plurality of electrode arrangements which are connected in series with one another. A desired current path is achieved when a current flowing via the said current path produces a magnetic field which drives the arc out of the point of its origin in order to increase it in size. Such a current path, which runs via the arc itself, forms a section of a conductor loop for example.

According to an expedient embodiment of the invention, the current-path bounding means border recesses inside the electrode. As a result of the recesses inside the electrode, the spark current is forced to flow around the said recesses. The current-path bounding means form bounding sections of the recesses, in which the current path is formed. The bounding sections are designed so that the desired current path is formed in the immediate vicinity of the arc. The current flowing via the current path then produces a magnetic field which drives the arc out of its point of origin, that is to say out of the point of the lowest electrode spacing, wherein the arc is increased in size with an attendant short deionization time.

Expediently, the current-path bounding means have a current-path bounding pin and/or a current-path bounding plate, which in each case have an electrical conductivity which differs from that of the remaining material of the associated longitudinal electrode in each case. The current-path bounding pin enables the current path in the electrode to be restricted to a certain region or to be combined in a region of the longitudinal electrode, wherein, according to a variant, the said region is the current-path bounding pin itself, namely when it has a higher conductivity than the electrode material in which it extends. As an alternative to this, the current-path bounding pin is made from an insulating material which does not conduct a current as well as the electrode material surrounding it. According to this embodiment, the current is forced to flow around the current-path bounding pin and to disperse in the remaining region of the electrodes. The current-path bounding plate is expediently made of a material which has a lower conductivity than the remaining material of the electrode in which it is arranged.

In a variant, each longitudinal electrode has a metallic electrode base and an electrode cap, which is made from a cap material which has a lower electrical conductivity than the base material of the electrode base.

Expediently, the electrode cap is made of graphite.

According to a preferred embodiment of the invention, the electrode cap is in the form of a mushroom cap and forms a hemispherical shield section and a stem section which is connected to the shield section. In doing so, shield section and stem section border internal cavities, which can also be referred to as recesses. As already explained above, the internal cavities or recesses force the current to disperse in the stem section or shield section, thus forcing a certain expedient current path.

According to an expedient embodiment of the invention in this regard, a current-path bounding plate is arranged between the electrode base and the electrode cap, wherein a current-path bounding pin extends through the current-path bounding plate in the stem section, wherein the current-path bounding plate and the current-path bounding pin are each made of a material which has a different conductivity from the material of the electrode cap and/or the material of the electrode base. With the help of the current-path bounding pin, the current-path bounding plate and the internal cavities, it is possible to quite specifically force the current to flow out of the electrode base, either through the stem section centrally into the shield section of the electrode cap, or over the whole length through the hemispherical shield section of the electrode cap. A direction can thus be impressed on the current such that the arc is quickly driven out of the initial electrode space in order to increase in size, wherein, for example, a shorter deionization time for the spark gap is established.

Expediently, the electrode arrangement has two longitudinal electrodes which face one another in a longitudinal direction and a lateral electrode which is offset with respect thereto in the transverse direction for actively triggering the spark gap, wherein the current-path bounding pin extends in the longitudinal direction and has a higher conductivity than the material of the electrode cap and the current-path bounding plate. In an alternative variant, a lateral electrode is not provided. Rather, the spark gap has two or more electrode arrangements connected in series. Each electrode arrangement of this series connection has two longitudinal electrodes. The longitudinal electrodes, which are connected to one another in series, are at a common medium-voltage potential when the spark gap is in operation. Each electrode arrangement of this series connection is usually arranged in a separate housing.

However, if only one electrode arrangement is provided within the scope of the invention, this expediently has the said lateral electrode which is arranged offset in a transverse direction with respect to the longitudinal electrodes. With such an electrode arrangement, the longitudinal electrodes expediently have an electrode pin which extends in the longitudinal direction and has a higher conductivity than the material of the electrode cap and the current-path bounding plate. When a lateral electrode is used, the initial arc does not originate between the longitudinal electrodes, but burns between each of the longitudinal electrodes and the lateral electrode. The lateral electrode is arranged on the side on which the spark burns and therefore to the side of the longitudinal electrodes. Because of the higher conductivity, the spark current flows via the current-path bounding pin, which extends in the longitudinal direction and therefore in the direction of the opposing longitudinal electrode. At the same time, one end of the current-path bounding pin protrudes into the hemispherical shield section, from where it runs laterally to the foot of the initial arc which forms on the longitudinal electrode due to the lateral electrode to the side of the longitudinal direction. The current-path bounding plate separates the electrode base from the electrode cap so that there is no direct contact between electrode base and electrode cap to form a current path. This avoids parasitic current paths. When the current emerges from the longitudinally aligned current-path bounding pin, it flows laterally through the electrode cap to the foot of the arc on the longitudinal electrode. The current path therefore encloses an angle with respect to the exit point which differs significantly from 180° and, for example, varies between 10° and 90°. As a result, the subsection of the current path comprising the arc and the cap section forms a conductor loop which, due to magnetic forces, has the tendency to diverge, with the consequence that the arc is driven out of the initial point, that is to say the point of the smallest spacing of the longitudinal electrode from the lateral electrode.

If, within the scope of the invention, a series connection of electrode arrangements is provided, then an alternative embodiment to this can be used. With this embodiment, the electrode pin, which extends in the longitudinal direction, and the current-path bounding plate are made of an electrically non-conducting insulating material, wherein the current-path bounding plate only separates the electrode base on part of the surface of the electrode cap. The separating region is arranged on the side of the respective longitudinal electrode on which the spark burns. The remaining surface is available for forming the current path. A lateral electrode is not provided with this embodiment of the invention, so that the arc initially forms between the longitudinal electrodes in the longitudinal direction.

As a result of the insulating current-path bounding pin and the insulating current-path bounding plate, which only prevent a direct contact between electrode base and electrode cap on the side of each longitudinal electrode on which the spark burns, the current is forced to flow laterally on the feed conductor side via the hemispherical shield section of the electrode cap to the foot of the arc, once again enclosing an angle with respect to the deflection point at the foot of the arc of the current path which varies between 130° and 10°. Once again, as already described above, a conductor loop is formed here by the subsection of the current path, as a result of which the arc is driven from the initial electrode burning point into the electrode arms.

Expediently, the electrodes have electrode arms which extend on a common side of the electrode arrangement on which the spark burns. Advantageously, the electrode arms of the longitudinal electrode and, if appropriate, the electrode arm of the lateral electrode, are arranged in a common plane. If the electrode arrangement has a lateral electrode, this is likewise expediently arranged in the plane which is enclosed by the electrode arms of the longitudinal electrodes.

Expediently, the electrode arms of the longitudinal electrodes diverge towards their free end while the spacing between them increases. In this advantageous way, the mutual spacing of the electrode arms increases towards their free end. An arc which is driven out of the electrode arrangement by magnetic forces therefore wanders to the point of the greatest spacing at the free end of the electrode arms with an attendant deionization time which is even further reduced.

Expediently, the electrical feed conductors for longitudinal electrodes of the electrode arrangement of the spark gap are both arranged together on the same side, which here is designated as the feed conductor side and lies opposite the side on which the spark burns. In doing so, the feed conductors advantageously extend substantially perpendicular to an arc which forms in the electrode arrangement. A magnetic field, which drives an arc which occurs at the electrode arrangement from the place of the smallest spacing between the electrodes into the electrode arms, which are arranged on the side of the electrode arrangement on which the spark burns and which faces away from the feed conductor side, is generated as a result of the common arrangement of the electrical feed conductors on the feed conductor side of the respective electrode arrangement and the simultaneous alignment in the said perpendicular direction.

Expediently, at least one reversing electrode which lies at the same potential as one of the longitudinal electrodes is provided, wherein, with regard to the free ends of the electrode arms, each reversing electrode is arranged so that an arc burning between the electrode arms jumps over to the reversing electrodes.

As has already been described above, the electrode arrangement according to the invention is arranged in at least one housing, which for space reasons cannot be arbitrarily large, in order to protect against environmental influences. The housing is a metallic housing, for example, wherein the housing walls are at an electrical potential and can likewise constitute an electrode for the arc. An arc which spreads out too far could therefore reach the housing and damage it due to its great heat. In addition, a current would flow via the housing. This is likewise undesirable. The uncontrolled formation of an arc is also disadvantageous. For this reason, at least one reversing electrode, which expediently lies at a high-voltage potential and on which one of the longitudinal electrodes is also located, is provided. Because of the geometrical arrangement of the reversing electrode and the associated modified current feed, the arc is repelled from the reversing electrode to the electrode arms of the electrode arrangement or to a further reversing electrode. Within the scope of this embodiment of the invention, the arc is therefore driven out of the electrode space into the electrode arms, from the ends of which the arc then transfers to the at least one reversing electrode. This therefore intercepts the arc, if necessary with the assistance of a further reversing electrode, before it jumps over to the housing wall.

Further expedient embodiments and advantages of the invention are the subject matter of the following description of exemplary embodiments of the invention with reference to the figures of the drawing, wherein the same references refer to similarly acting components, and wherein

DESCRIPTION OF THE INVENTION

Figure 1:
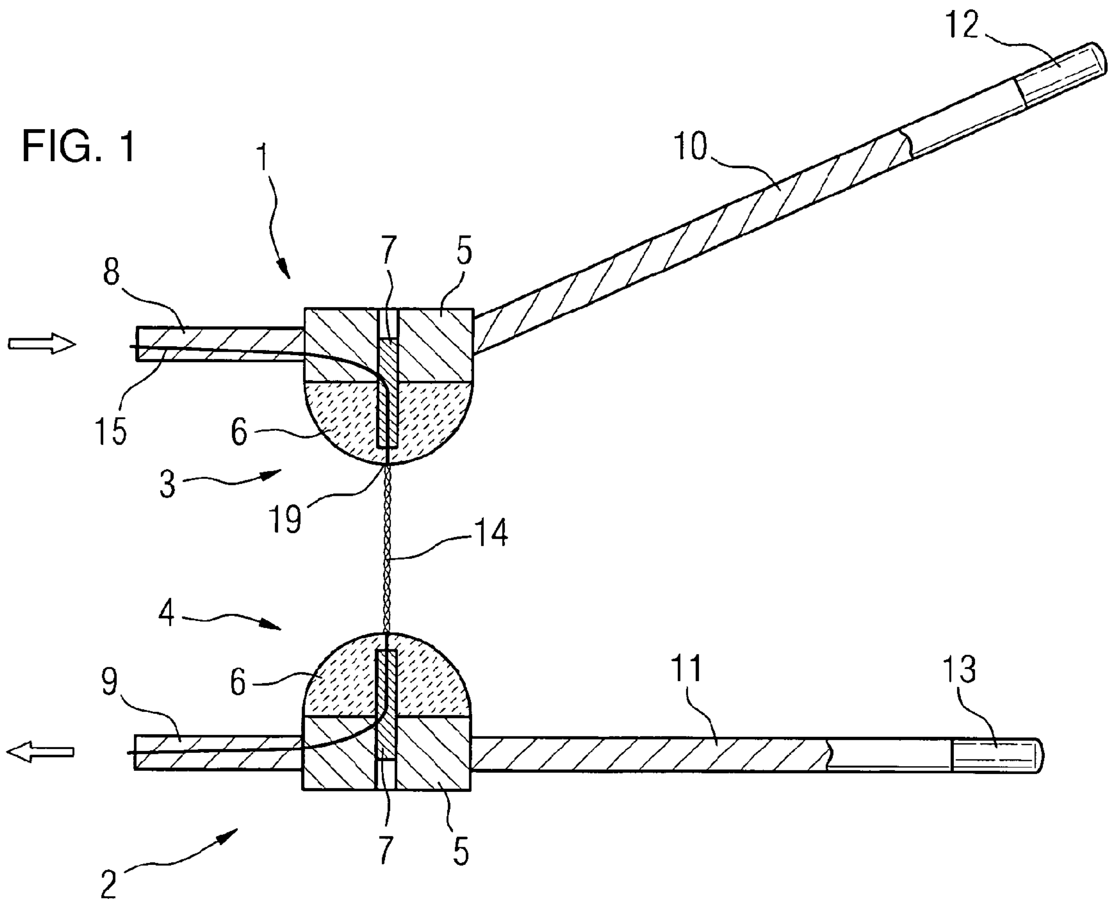
FIG. 1 shows an exemplary embodiment of an electrode arrangement of a spark gap according to the invention.

FIG. 1 shows a first exemplary embodiment of the spark gap 1 according to the invention, which has an electrode arrangement 2 with a first longitudinal electrode 3 and a second longitudinal electrode 4. The electrode arrangement 2 is connected in series with a further electrode arrangement, which is not shown in the figure. Here, each electrode arrangement 2 is arranged in a separate housing. When the spark gap 1 is in operation, two longitudinal electrodes of the series connection are at an intermediate voltage potential. In the electrode arrangement 2 shown in FIG. 1, the longitudinal electrode 3 is at a high-voltage potential and the longitudinal electrode 4 is at the intermediate voltage potential. It can be seen that each longitudinal electrode 3 and 4 respectively has an electrode base 5 and an electrode cap 6. At the same time, the longitudinal electrodes 3 and 4 respectively lie opposite one another in a longitudinal direction. More accurately, the longitudinal direction extends through the points on the respective longitudinal electrode which have the smallest spacing from one another. Furthermore, each longitudinal electrode 3, 4 has an electrode pin 7 which extends in the said longitudinal direction as a current-path bounding pin made of copper. The electrode base 5 is made of aluminum, wherein the electrode cap 6 is made of graphite. It can also be seen in FIG. 1 that electrical feed conductors 8 and 9 extend perpendicular to the said longitudinal direction on a common feed conductor side of the electrode arrangement 2 and are connected to the electrode base 5 of the longitudinal electrode 3 and 4 respectively.

Electrode arms 10, 11 likewise extend in a perpendicular direction on the side of the electrode arrangement 2 on which the spark burns and which faces away from the feed conductor side, wherein each electrode arm 10, 11 is connected to the electrode base 5 of the associated longitudinal electrode 3 and 4 respectively. The feed conductors 8, 9 of the electrode base 5 and the electrode arms 10, 11 are each made of aluminum and all lie in a common plane. A consumable section 12 and 13 respectively, which is made of a material which has a high resistance to heat, is formed on the free end of each electrode arm 10 and 11 respectively, so that an arc burning there causes minimal damage. Furthermore, an initial arc 14, which occurs at the point with the smallest spacing between the longitudinal electrodes 3 and 4, is shown schematically in FIG. 1. A current path 15 is also shown, as well as the direction of the current flow by means of arrows.

It can be seen that a current which flows after the spark 1 is triggered initially flows in the longitudinal direction in the aluminum of the electrode base 5 and then in the copper electrode pin 7, from there, also flowing in the longitudinal direction, into the arc 14 and then away via the electrode pin 7 of the longitudinal electrode 4.

Magnetic fields, which drive the arc 14 from the point at which it was initially triggered to the free end 12 and 13 respectively of the electrode arms 10 and 11 respectively, are generated due to the arrangement of the electrical feed conductors 8 and 9 on the same side of the electrode arrangement 2, namely the feed conductor side, and the parallel alignment of the feed conductors 8, 9. For this reason, in doing so, an arc is quickly driven from its point of origin in the spark gap 1 quickly into the electrode arms.

Figure 2:
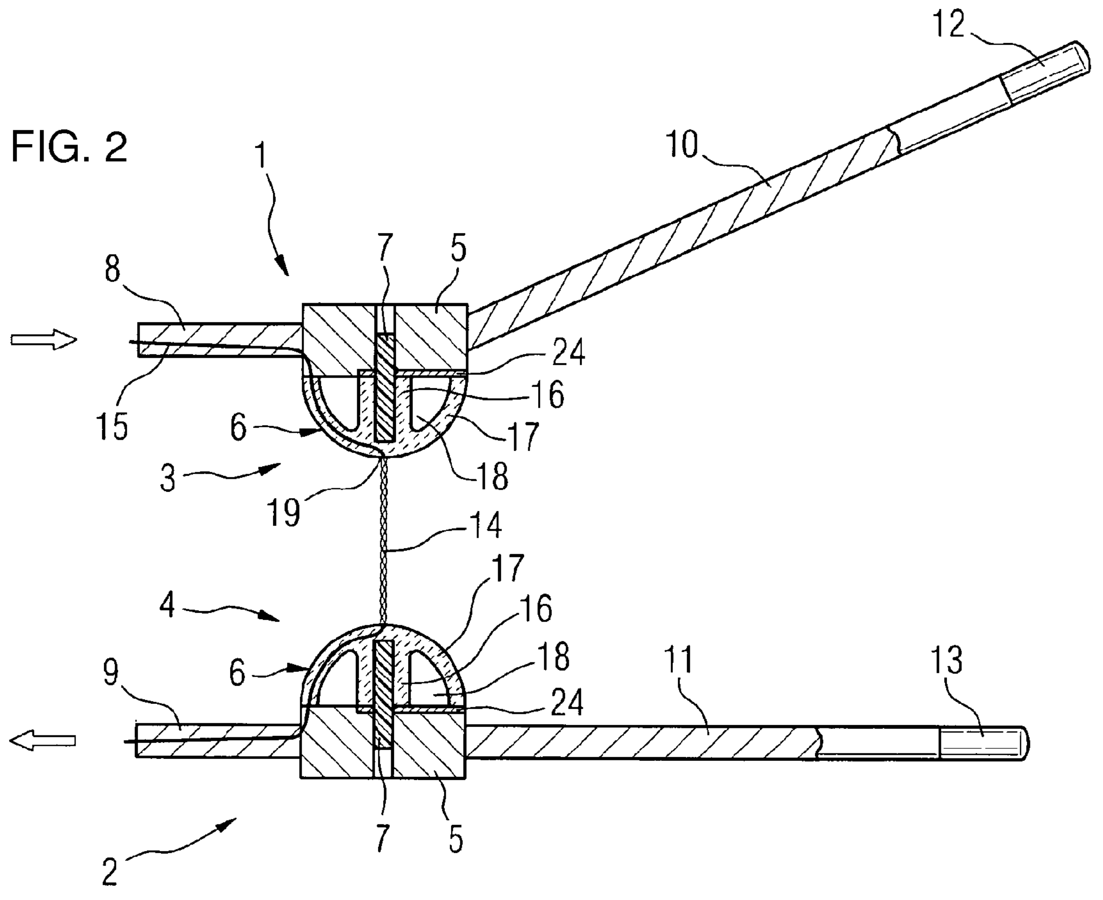
FIG. 2 shows a further exemplary embodiment of an electrode arrangement of a spark gap according to the invention.

FIG. 2 shows a further exemplary embodiment of the spark gap 1 according to the invention, wherein, however, each longitudinal electrode 3 and 4 respectively has current-path bounding means which are formed by the electrode pin 7, a current-path bounding plate 24 arranged partially between electrode base 5 and electrode cap 6, and an expedient geometric embodiment of the electrode caps 6. The electrode caps 6 are in each case in the form of mushroom caps and have an inner, elongated pin section 16 and a shield section 17 which is hemispherical in shape. The pin section 16 and the shield section 17 border internal cavities 18, which can also be referred to as recesses. Here, the electrode pin 7 is made of an electrically non-conducting insulating material. The current-path bounding plate 24 also has a substantially lower electrical conductivity than the electrode base 5 and electrode cap 6. At the same time, the current-path bounding plate 24 is arranged between electrode cap 6 and the electrode base 5 only on the side on which the spark burns, and prevents a direct contact of the said components only on this side. Because of the poorer electrical conductivity of the electrode pin 7 and the current-path bounding plate 24 compared with the graphite of the shield section 17, the current path 15 is therefore formed in the shield section 17 on the feed conductor side from where it passes into the arc 14 and from there into the shield section 17 of the longitudinal electrode 4. In doing so, there is a change in direction of the current path at deflection points. With regard to these deflection points, the current path therefore encloses an angle which, in the exemplary embodiment shown, is approximately 130°. The kink in the current path, which, compared with FIG. 1, is displaced towards the exit point of the arc, narrows a current loop towards the arc and, as a result, at this point intensifies the magnetic field generated by the current and therefore assists the driving-out of the arc from the point at which it was initially triggered into the electrode arms 10 and 11 respectively. The deionization time of the spark gap 1 is even further reduced compared with the exemplary embodiment shown in FIG. 1, as this advantageous course of the current path is established in the immediate vicinity of the arc.

Figure 3:
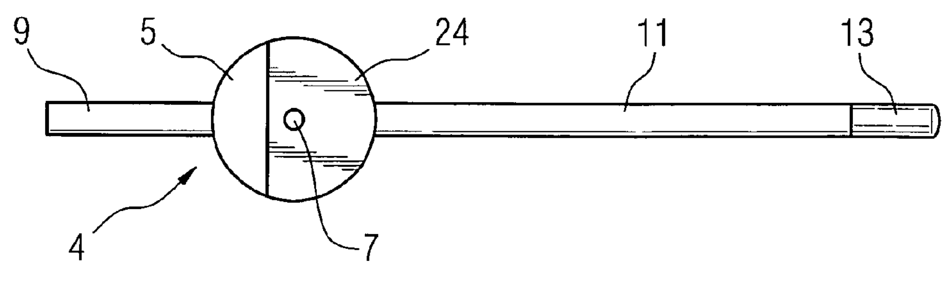
FIG. 3 shows a longitudinal electrode of the spark gap according to FIG. 2 in a plan view, wherein the electrode cap has been removed.

FIG. 3 shows the longitudinal electrode 4 of the spark gap 1 according to FIG. 2 in a plan view, wherein, however, the electrode cap 6 has been removed. In the exemplary embodiment shown, it can be seen that the current-path bounding plate 24 consists only of a circular segment and therefore does not fully cover but only partially covers the electrode base 5, and is arranged on the side on which the spark burns, in other words facing the electrode arms 10, 11. A direct contact between electrode base 5 and electrode cap 6 is therefore provided on the feed conductor side. As an alternative to this embodiment, the current-path bounding plate can be designed with two segments and have a circular segment with good conductivity here on the feed conductor side for the formation of the current path.

Figure 4:
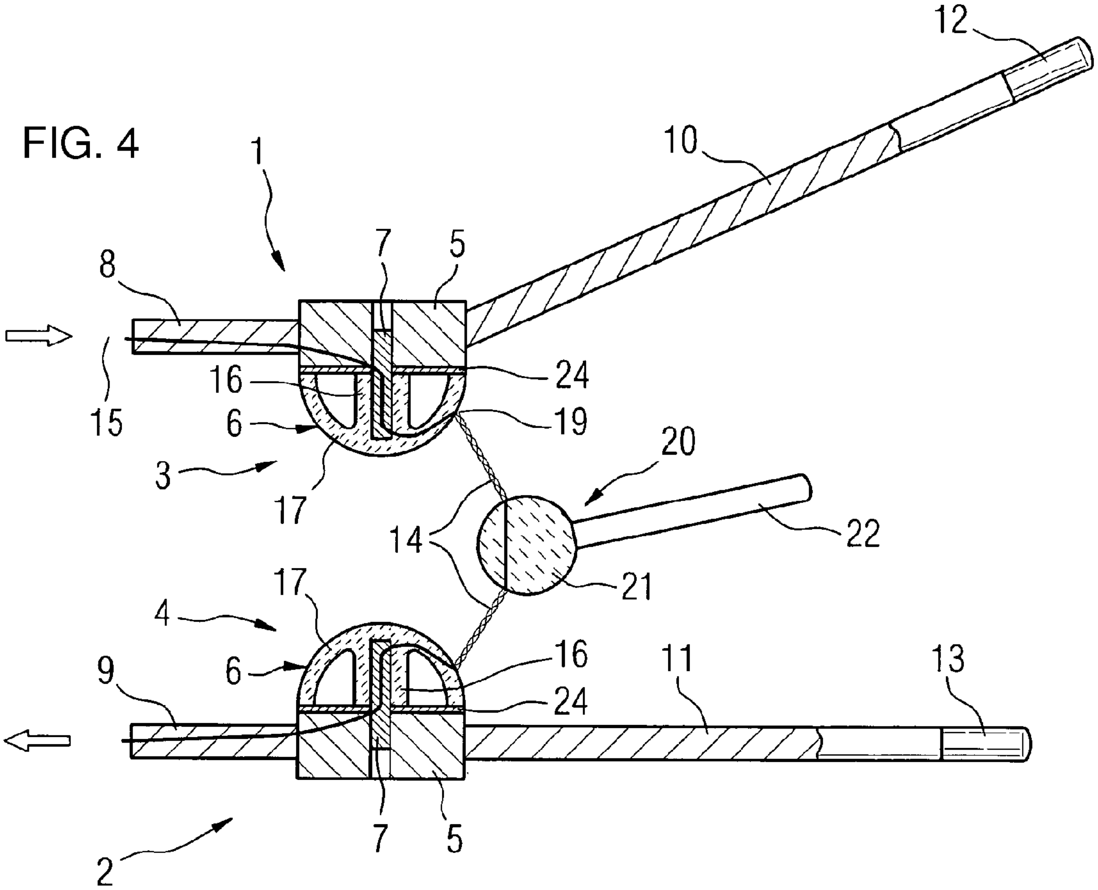
FIG. 4 shows a further exemplary embodiment of an electrode arrangement of a spark gap according to the invention with a lateral electrode.

FIG. 4 shows a further exemplary embodiment of the spark gap 1 according to the invention, wherein, like the exemplary embodiment according to FIG. 3, the electrode arrangement 2 again has the longitudinal electrodes 3 and 4 respectively and also a lateral electrode 20. The current-path bounding means of the electrode arrangement 2 are realized by the current-path bounding plate 24, the electrode pin 7 which extends in the longitudinal direction through the current-path bounding plate 24, and by the mushroom-cap-shaped design of the electrode cap 6. In the exemplary embodiment shown in FIG. 4, each electrode pin 7 is made of copper, that is to say a better conducting material compared with the aluminum of the electrode base 5, the graphite of the electrode cap 6 and the material of the current-path bounding plate 24, so that the current path 15 initially forms in the aluminum of the electrical feed conductor 8, the aluminum of the electrode base 5 and the copper electrode pin 7 in the longitudinal direction, to then pass laterally, forming a first deflection point, into the hemispherical shield section 17, and to flow at an angle into the arc 14 at the exit point 19 forming a further deflection point. Correspondingly large changes in angle in the vicinity of the arc occur at the longitudinal electrode 4. Because of these significant changes in angle, an approximation to a conductor loop is formed in each case, as a result of which the arc is driven particularly quickly into the electrode arms 10, 11, even with large electrode spacings.

Figure 5:
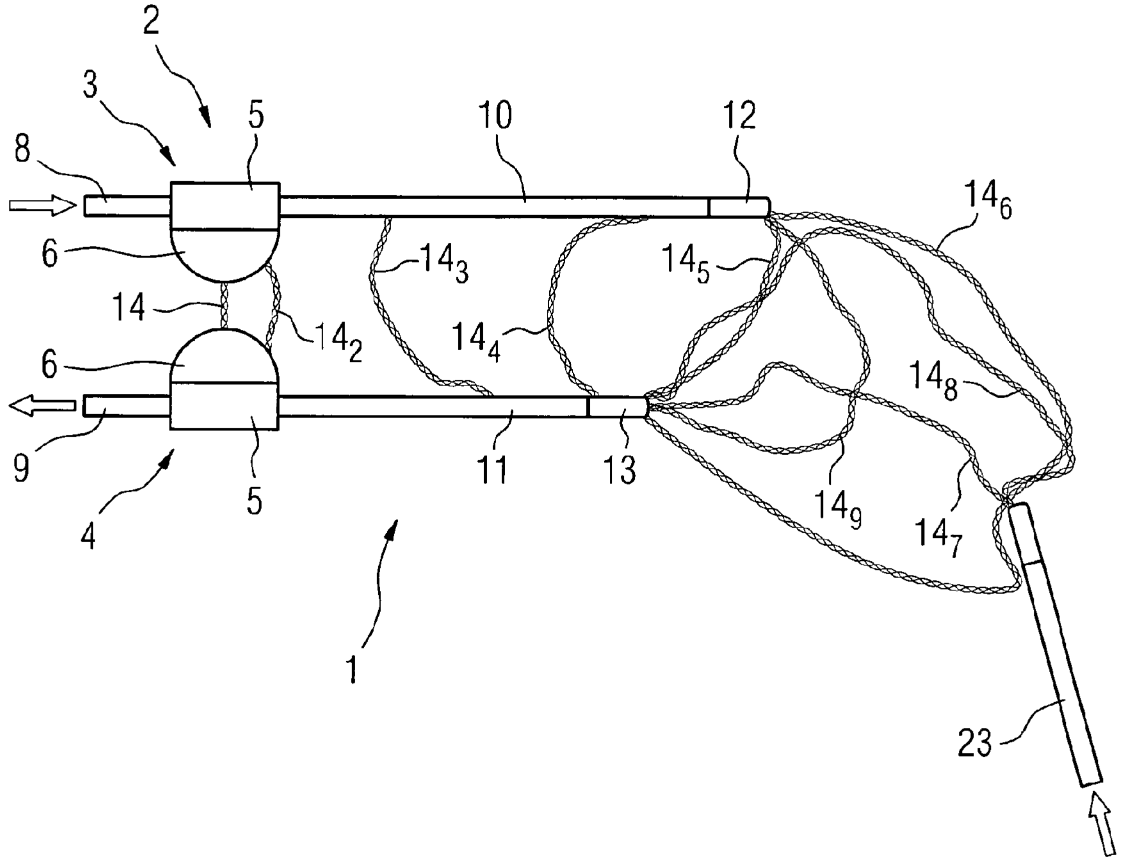
FIG. 5 shows a further exemplary embodiment of an electrode arrangement of a spark gap according to the invention.
Figure 6:
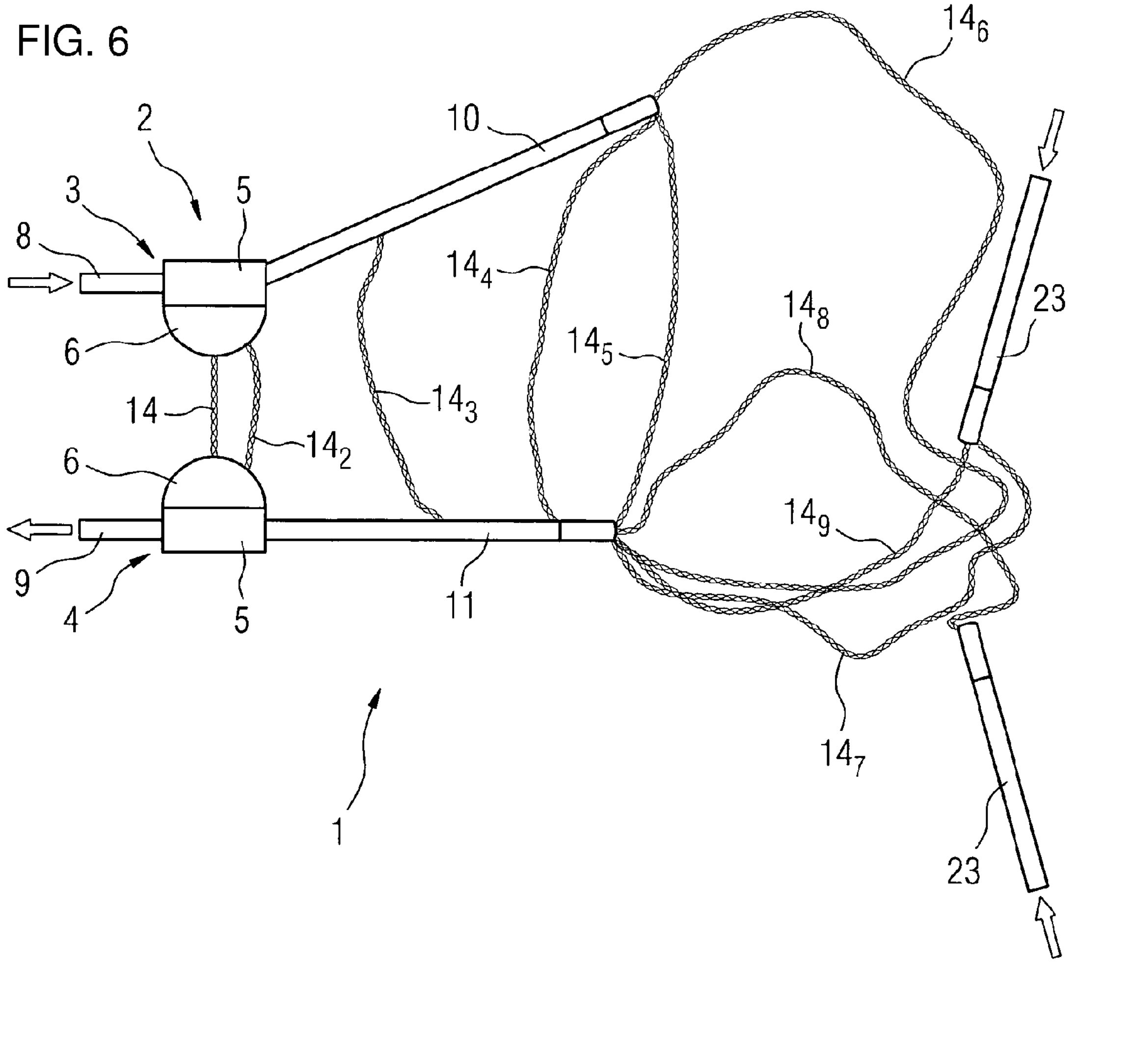
FIG. 6 shows a further exemplary embodiment of an electrode arrangement of a spark gap according to the invention.

FIG. 5 shows a further exemplary embodiment of the spark gap 1 according to the invention, wherein a reversing electrode 23 is provided alongside the electrode arrangement 2. The reversing electrode 23 is arranged with respect to the electrode arms 10 and 11 respectively so that an arc accelerated by the magnetic fields formed according to the invention is driven into the electrode arms 10, 11 and ultimately intercepted in a controlled manner by the reversing electrode 23. In order to clarify this effect, the pattern of the arc at different times is shown in FIG. 6, wherein the indices increase as the time for which the arc 14 burns increases. The initial arc is again designated with the reference 14. It originates at the point of smallest spacing between the longitudinal electrodes 3 and 4 respectively. Because of the magnetic forces, the arc 14 is driven out of the electrode region and, as can be seen from the patterns $\mathbf{14_2}$, $\mathbf{14_3}$, $\mathbf{14_4}$ and $\mathbf{14_5}$, wanders to the free end 12 and 13 respectively of the electrode arms 10 and 11 respectively. Here, the arc bulges further out from the pattern referenced with the designation $\mathbf{14_5}$ to the pattern $\mathbf{14_6}$ and finally burns between the reversing electrode 23 and the electrode arm 11 of the longitudinal electrode 4 as is shown by the pattern $\mathbf{14_7}$. The reversing electrode 23 is at the same potential as the longitudinal electrode 3. Here, the current pattern changes, as the spark current now flows via the reversing electrode as shown by arrows in FIG. 5. As a result of the magnetic fields which are established, the arc is then repelled from the reversing electrode to the electrode arms 10 and 11 and has the pattern $\mathbf{14_8}$ for example. Pattern $\mathbf{14_9}$ indicates that an interplay is set up between reversing electrode 23 and electrode arm 10.

FIG. 6 shows a further exemplary embodiment of the spark gap 1 according to the invention, wherein, however, the electrode arms 10, 11 no longer run parallel to one another—as shown in FIG. 5—but their spacing from one another increases towards their free ends. In order to enable the arc to be reliably intercepted even when the electrode arms 10, 11 diverge, two reversing electrodes 23, which are likewise arranged with regard to the free ends of the electrode arms 10 and 11 so that the arc 14 is intercepted, are provided. FIG. 6 also shows arc patterns at different times, wherein the indices of the reference 14 increase as the time for which the arc burns increases. From the patterns 14, $\mathbf{14_2}$, $\mathbf{14_3}$, $\mathbf{14_4}$ and $\mathbf{14_5}$, it can be seen that the arc is driven to the free ends of the electrode arms 10, 11 by the magnetic forces produced according to the invention. From the pattern $\mathbf{14_6}$, it can be seen that the arc finally bulges to such an extent that there is a risk of the arc jumping over to the spark gap 1 housing, which is not shown in the figure. However, this is prevented by the top reversing electrode 23 shown in FIG. 7 to which the arc $\mathbf{14_7}$ jumps first. As a result of the new direction of the current flow, the arc $\mathbf{14_8}$ is then repelled onto the bottom reversing electrode 23, whereupon a new current flow is re-established. This causes the arc $\mathbf{14_9}$ to jump back onto the top reversing electrode 23 so that an interplay is set up between the top and bottom reversing electrode 23. The reversing electrodes 23 enable a compact design of the housing and therefore of the whole spark gap.

The invention claimed is:

1. A spark gap configuration for providing overvoltage protection, the spark gap configuration comprising:

an electrode configuration having electrodes facing one another, at least some of said electrodes have current-path bounding means for forcing a desired current path in said electrodes, said electrodes having electrode arms extending on a common side of said electrode configuration on which a spark burns.

2. The spark gap configuration according to claim 1, wherein:

said electrodes have recesses formed therein on an inside; and said current-path bounding means border said recesses inside an associated said electrode in each case.

3. The spark gap configuration according to claim 1, wherein said current-path bounding means have at least one of a current-path bounding pin or a current-path bounding plate, which in each case have an electrical conductivity which differs from that of a remaining material of an associated said electrode in each case.

4. The spark gap configuration according to claim 1, wherein each of said electrodes has a metallic electrode base and an electrode cap, which is made from a cap material which has a lower electrical conductivity than a base material of said electrode base.

5. The spark gap configuration according to claim 4, wherein said electrode cap is made of graphite.

6. The spark gap configuration according to claim 4, wherein said electrode cap has internal cavities formed therein and is in a form of a mushroom cap, said electrode cap further and having a hemispherical shield section and an elongated stem section which each border said internal cavities.

7. The spark gap configuration according to claim 6, further comprising:

a current-path bounding plate disposed between said metallic electrode base and said electrode cap; and a current-path bounding pin extending through said current-path bounding plate in a stem section, said current-path bounding plate and said current-path bounding electrode pin are each made of a material which has a different conductivity from at least one of said cap material of said electrode cap or said base material of said electrode base.

8. The spark gap configuration according to claim 7, wherein said electrode configuration has two longitudinal electrodes which oppose one another in a longitudinal direction and a lateral electrode which is offset with respect thereto in a transverse direction for actively triggering the spark gap configuration, wherein said current-path bounding pin extends in the longitudinal direction and has a higher conductivity than said cap material of said electrode cap and said material of said current-path bounding plate.

9. The spark gap configuration according to claim 8, wherein said current-path bounding pin, which extends in the longitudinal direction, and said current-path bounding plate are made of an electrically non-conducting insulating material, wherein said current-path bounding plate only extends partially between said electrode base and said electrode cap.

10. The spark gap configuration according to claim 1, wherein said electrode arms diverge towards their free end while a spacing between said electrode arms increases.

11. The spark gap configuration according to claim 1, wherein said electrode configuration has two longitudinal electrodes which oppose one another in a longitudinal direction and a lateral electrode which is disposed offset with respect to said longitudinal electrodes in a transverse direction towards a side on which a spark burns, and said lateral electrode has an electrode arm which extends in the transverse direction on a side on which the spark burns.

12. The spark gap configuration according to claim 11, wherein said electrode arms extend in a common plane.

13. The spark gap configuration according to claim 11, further comprising at least one reversing electrode which lies at a same potential as one of said longitudinal electrodes, wherein, with regard to free ends of said longitudinal electrodes, said reversing electrode is disposed so that an arc burning between said electrode arms jumps over to said reversing electrodes.

* * * * *